United States Patent [19]
Burns

[11] Patent Number: 5,536,401
[45] Date of Patent: * Jul. 16, 1996

[54] MAGNET HOLDER ASSEMBLY

[75] Inventor: Kyle Burns, Philadelphia, Pa.

[73] Assignee: Saveco, Inc., Philadelphia, Pa.

[ * ] Notice: The portion of the term of this patent subsequent to Jun. 14, 2011, has been disclaimed.

[21] Appl. No.: 203,224

[22] Filed: Feb. 28, 1994

Related U.S. Application Data

[63] Continuation of Ser. No. 880,195, May 8, 1992, Pat. No. 5,320,751, which is a continuation-in-part of Ser. No. 640,016, Jan. 11, 1991, Pat. No. Des. 337,148.

[51] Int. Cl.$^6$ ............................................. C02F 1/48
[52] U.S. Cl. ................................. 210/222; 123/538
[58] Field of Search .................... 210/222; 123/536, 123/538; 335/303

[56] References Cited

U.S. PATENT DOCUMENTS

| | | | |
|---|---|---|---|
| D. 253,841 | 1/1980 | Sanderson | D23/1 |
| D. 262,306 | 12/1981 | Carpenter | D23/1 |
| D. 289,674 | 5/1987 | Kulish | D23/3 |
| 2,936,982 | 5/1960 | Cushenberry | 248/743 |
| 3,913,187 | 10/1975 | Okuda | 24/543 |
| 4,265,755 | 5/1981 | Zimmerman | 210/222 |
| 4,344,593 | 8/1982 | Canto | 248/73 |
| 4,605,498 | 8/1986 | Kulish | 210/222 |
| 5,070,852 | 12/1991 | Po et al. | 123/538 |
| 5,320,751 | 6/1994 | Burns | 210/222 |

OTHER PUBLICATIONS

Magnetizer Fuel Energizer Brochure, Date Unknown.
Petro–Mag Brochure, Date Unknown.
Pesco 5 Brochure, Date Unknown.
Energy Saver Brochure, Date Unknown.

*Primary Examiner*—Matthew O. Savage
*Attorney, Agent, or Firm*—Louis Weinstein

[57] ABSTRACT

A magnet assembly for holding magnets on and around a fuel line to improve combustion of fuel in an engine supplied by the fuel line, comprises a rubber-like one-piece magnet casing having two integral halves hinged together at one end and spring-biased toward each other. A pair of facing axial semi-cylindrical grooves are formed in the two casing halves, which in use embrace the periphery of the fuel line. A flexible strip-like diaphragm of the same resilient rubber-like material extends across each groove, to provide a spring-tensioned grip on the fuel line when the halves of the casing are urged toward each other. To provide this action, a tie encircles the exterior of the casing and is pulled tight to clamp the two halves of the casing on the fuel line.

10 Claims, 2 Drawing Sheets

MAGNET HOLDER ASSEMBLY

REFERENCE TO RELATED APPLICATIONS AND CLAIM OF PRIORITY

This is a continuation of application Ser. No. 07/880,195, filed May 8, 1992, now U.S. Pat. No. 5,320,751, which is also a continuation-in-part of Design patent application Ser. No. 07/640,016, filed Jan. 11, 1991, on behalf of Kyle Burns, now U.S. Design Pat. No. 337,148.

BACKGROUND OF THE INVENTION

For a number of years, a variety of products have been introduced onto the market which have taken advantage of the effects of magnetic fields on fluids and specifically on fluids flowing through pipes and other conduits. The introduction of a magnetic field adjacent to flowing fluids has been shown to provide numerous advantages including the removal of build-up within pipes, and the more efficient and cleaner burning of gasoline and other fuels.

A number of U.S. patents have issued which are directed to this technology. U.S. Pat. No. 4,605,498 to Peter A. Kulish, issued Aug. 12, 1986, describes a method and apparatus for the treatment of liquids by the concentration of magnetic fields in liquids passing through a conduit. In the device disclosed in this patent, appropriately oriented magnets are placed within a casing having a central aperture which is split into at least two portions, thereby enabling the portions to be placed around the conduit and fastened by means of small tabs, ears, or snap joints. The small tabs, ears and snap joints hold the portions in position about the conduit; the interior of the casing immediately surrounding the conduit is provided with several different removable rings, such that by removing an appropriate number of the rings a close fit to the conduit exterior can be approximated.

Design Pat. No. 289,674 of the same Peter Kulish, and issued May 5, 1987, discloses a specific arrangement of the casing which is constructed in two parts, each having broad extending lateral ears and each arranged to cover 180° of exterior of the conduit with the ears then coming into alignment and being secured together by some appropriate fastener to hold the entire casing in place.

U.S. Design Pat. Nos. 253,841 and 263,306 also illustrate multi-part magnetic holders.

The foregoing designs for magnet casings have several disadvantages in actual practice. Initially, as exemplified in U.S. Pat. No. 4,605,498, many prior art designs require the manufacture and provision of a plurality of interior rings and the removal of various of them by the operator, in order to approximate a close fit to the interior conduit. Such devices therefore are often difficult to correctly place and position and may require a fair degree of trial and error. Multiple piece devices also can frequently corrode and break apart.

Other embodiments shown in U.S. Pat. No. 4,605,498, as well as the apparatus shown in Design Pat. No. 289,674, are difficult for one person to install, because they involve the assembly of the separated parts of the casing about the conduit, and the holding of them with one hand while with the other hand one attempts to secure the necessary fasteners. Such components may be particularly difficult to assemble in an automobile or truck, where fuel lines may be difficult to reach.

It would be desirable to provide a magnet casing which can be applied for gasoline or diesel engines which facilitates easy attachment, and which facilitates attachment with a single hand. It would be further desirable to provide a magnet casing which can more readily accommodate a wide variety of conduit diameters.

Accordingly, it is an object of the present invention to provide a magnet holding assembly appropriate for installation on the exterior of the conduit, which is both easy to install and yet ensures a tight fit to the conduit.

It is a further object of the present invention to provide a magnet holding assembly which can easily accommodate a variety of conduit parameters.

It is also an object to provide such a casing which is easy and inexpensive to manufacture.

BRIEF SUMMARY OF THE INVENTION

These and other objects of the invention are achieved by the provision of a magnet assembly for mounting about a liquid conduit so as to subject liquid flowing in the conduit to a magnetic field. The invention, in a preferred embodiment, comprises a pair of magnet casing portions mounted to each other, and including resilient hinge means for biasing and urging said casing portions pivotally toward each other, i.e. toward a mutually closed position.

Each casing portion has a central axial groove, facing the groove in the other casing portion, so that when the assembly is placed about the conduit, the conduit is aligned with the grooves and grasped between the casing portions due to the spring action which urges them toward each other.

Preferably, a flexible diaphragm extends across each groove in each casing portion and bears against the exterior of the conduit, providing in essence a resilient band which assures close contact to and grasping of the conduit when the assembly is put in place, despite differences in size of the conduit, over a substantial range of sizes. The assembly thus can easily accommodate and provide a tight fit for conduits having a wide range of diameters. The assembly preferably also includes means such as a plastic tie or other securing means, extending through the hinge and around and against the exterior periphery of the entire assembly, which is tightened to urge the two portions of the casing toward each other and against the conduit, with the two diaphragms contacting and squeezing the exterior of the conduit so as to insure a snug fit.

Each casing portion includes one or more magnets, similar poles of which are positioned adjacent the radially inward face of the casing, with the opposite poles of each magnet portion lying adjacent the exterior of the casing, radially outward from the first set of poles, thereby providing predominantly one type of magnet pole adjacent the interior conduit.

Furthermore, in the preferred embodiment of the invention the entire assembly is such as can be molded integrally in one piece, including the diaphragm portions, thus effecting substantial savings in manufacturing costs.

BRIEF DESCRIPTION OF THE DRAWINGS

These and other objects and features of the invention will be more readily understood from a consideration of the following detailed description, taken with the accompanying drawings, in which.

DETAILED DESCRIPTION OF PREFERRED EMBODIMENT

Figure 1:
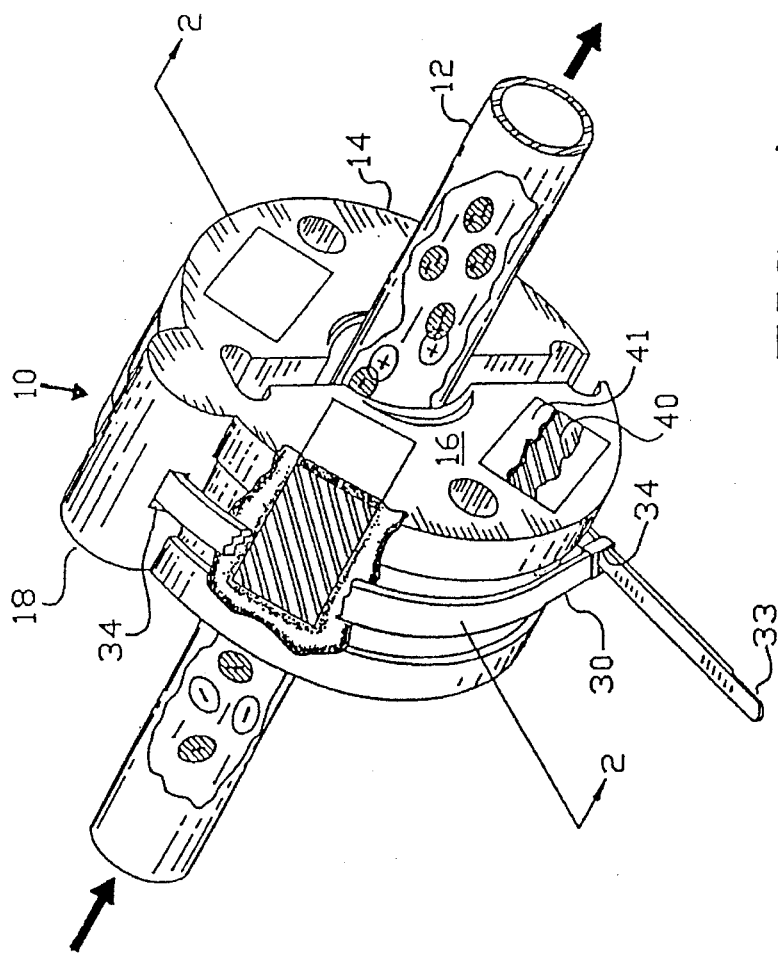
FIG. 1 is a perspective view of a magnet assembly of the invention in place on a liquid casing conduit.

Referring now to the specific embodiment of the invention shown in the drawings by way of example only, and without thereby in any way limiting the scope of the present invention, there is shown a magnet assembly 10, which in FIG. 1 is mounted in place on a liquid-carrying conduit 12. In a preferred embodiment the conduit may comprise a fuel line such as found in an automobile, truck or marine craft. The assembly is made up of two casing portions or halves 14 and 16 (see FIG. 3) hinged together by a resilient hinge means 18. The casing portions 14, 16 have respective grooves or openings 20 and 22 across which there extend respective diaphragms 24 and 26, made of resilient material. Preferably a flexible diaphragm 24, 26 extends across each groove in each casing portion and bears against the exterior of the conduit 12 providing in essence a resilient band which assures close contact to and grasping of the conduit 12 when the assembly is put in place, despite differences in size of the conduit, over a substantial range of sizes. Each said casing half, 14, 16 and diaphragm 24, 26 provided therewith, together define an opening 20, 22 extending through the respective casing half in a direction substantially parallel to the axis of hinge means 18. The assembly thus can easily accommodate conduits having a wide range of diameters.

Preferably, the entire unit is one integral molded piece of elastomeric material such as rubber. The hinge means 18 in this case is merely a thickened region of the elastomeric material joining the two semi-cylindrical casing portions, which thickened portion by its own resilience provides a spring-biased hinge action which tends to force the casing portions 14 and 16 toward a closed position. The spring biased resilient hinge action of the hinge means 18 facilitates attachment of the magnet assembly 10 to a fuel line. The biasing of the hinge facilitates ease of clamping and attachment of the assembly with one hand.

Figure 4:
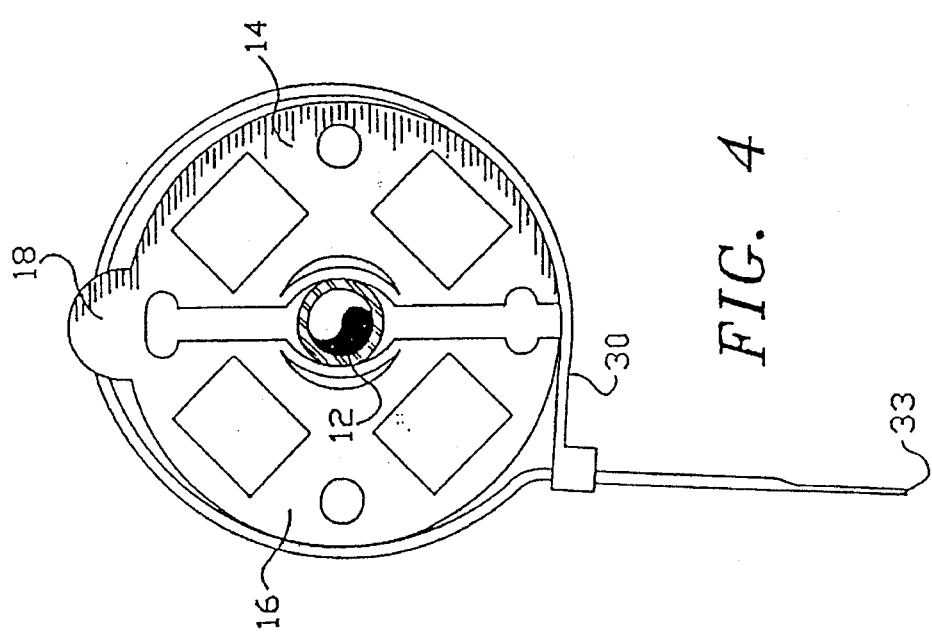
FIG. 4 is a front view of the magnet assembly of the invention as installed on a conduit.
Figure 3:
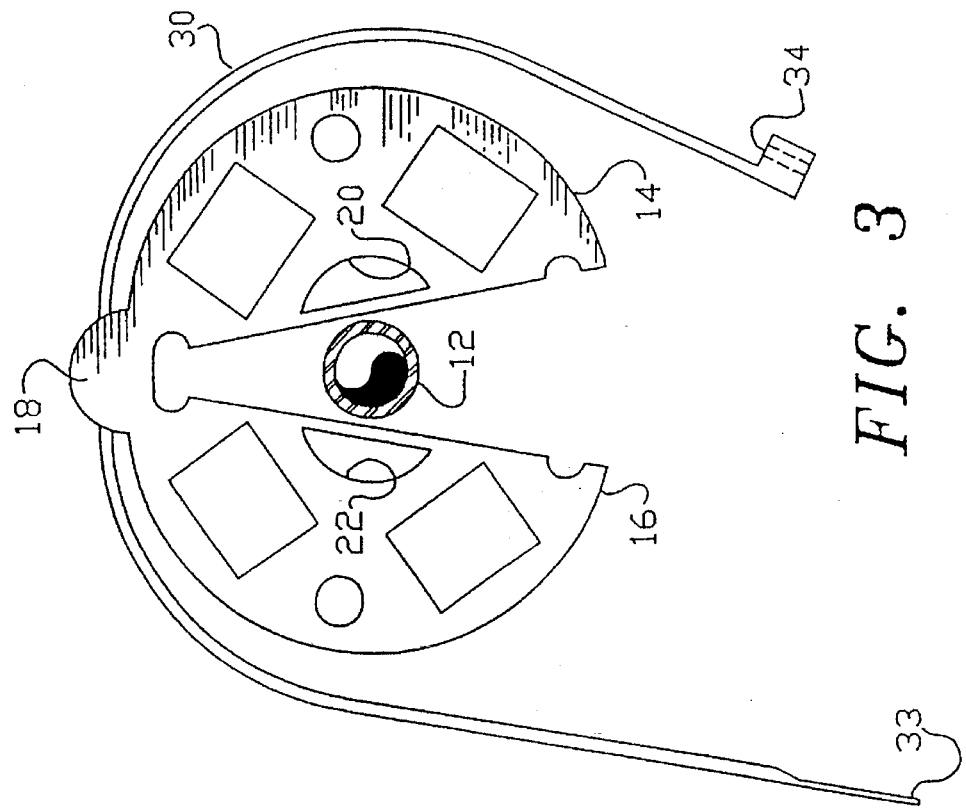
FIG. 3 is a front elevational view of the magnet assembly of the invention when it is opened and placed over and around the conduit.

Referring to FIGS. 3 and 4, once the assembly is placed about the conduit 12, securing means such as a long plastic tie 30 is preferably run about the periphery of the casing and through the slot 32 in the hinge means 18, and secured by passing tip end 33 of the tie through locking aperture 34 in the tie and pulling the tie tight, to squeeze the casing tightly around the conduit 12. Such tightening will deflect the diaphragms 24 and 26 apart from each other (radially outwardly), so that they exert a clamping and securing action on the conduit to prevent further motion of the assembly. In the alternative, other attachment means may be utilized to attach the free ends of the casing portions 14, 16 including various locks and catches well known to those skilled in the art.

Figure 2:
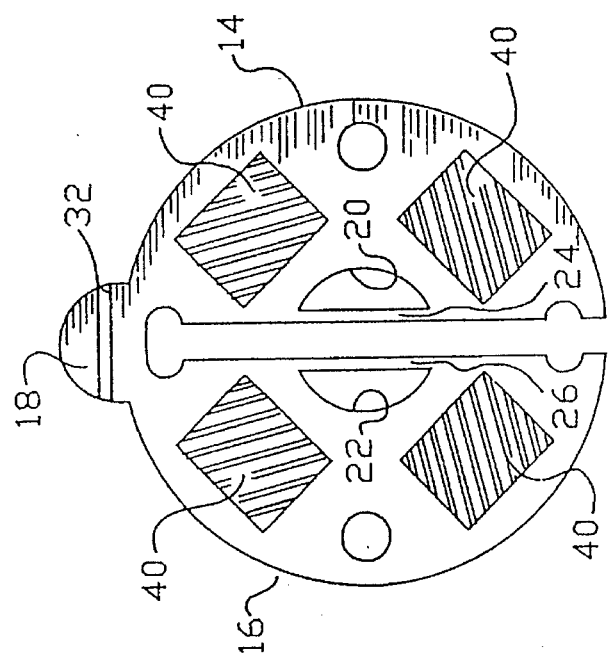
FIG. 2 is a sectional view of the casing of the magnet assembly of the invention, without the tie and before placement on the conduit, showing the unflexed configuration of the diaphragms which exists when no conduit is present.

As shown in FIG. 2, the magnet assembly comprises a plurality of magnets 40 situated in wells in the casing. The south poles of the magnets are disposed about and adjacent the conduit 12, the north poles of the magnets being disposed about and adjacent the periphery of the casing, whereby a south pole field is selectively applied to the liquid in the conduit. It is to be appreciated that other magnet arrangements may be useful in other applications. In this example the top of each magnet well is closed by a small rectangular tab such as 41, pushed into the top of the magnet well and against the top of the corresponding magnet.

The theory of operation of the present invention is that the magnet field from the magnets 40 charges positively the normally negative fuel particles shown shaded in FIG. 1, as they flow through the conduit. The fuel particles are then attracted to the originally negatively-charged oxygen molecules shown unshaded in FIG. 1, thereby eliminating the repulsion normally existing between fuel and oxygen, and thereby enhancing combustion, fuel efficiency and reducing pollution.

In a preferred embodiment which has been manufactured, the entire assembly was made of an elastomeric material known in the trade as Alcryn ALR-6386 A 65. The casing weighed 1.4 ounces, while the magnets were of material known in the trade as Ceramic-5, and added about 0.7 ounces of weight to the assembly. The assembly was about 7 inches in outer circumference and about ⅞ inch in axial thickness. The tie was about 10 inches in length, ⅛ inch in thickness, and of nylon.

In order to attach the device about a conduit, the magnet casing portions 14, 16 are forced open about the hinge means 18 and attached around the fuel line conduit 12. The biasing hinge means 18 functions to bias the casing portions closed. The diaphragms 24, 26 secure the casing portions 14, 16 around the conduit 12 and facilitate secure attachment about the conduit. When placed around the conduit, the attachment strap 30 is then secured.

To place the magnet assembly of the invention in place on a generally horizontal conduit such as a horizontal fuel supply line in an automobile, the tie is threaded through the hinge and the two portions 14, 16 of the casing, biased closed by hinge means 18, are held apart by the installer's fingers thus defining a jaw opening. The resultant jaw opening is moved downwardly onto and around the conduit 12 so that when released the two portions of the casing move together via the action of the hinge means and hold themselves in position on the line while the tie is tightened to provide final secure mounting and tensioning of the diaphragms 24, 26 against the exterior of the conduit. The unit is thereby easily placed in position and securely held.

There has therefore been described a magnet assembly which is easily placed upon and tightly secured to a conduit, such as an automobile fuel line, and which is easy and inexpensive to fabricate.

While the invention has been described with particular reference to specific embodiments in the interest of complete definiteness, it will be understood that it may be embodied in a variety of forms diverse from those specifically shown and described, without departing from the spirit and scope of the invention.

What is claimed is:

1. A magnet assembly for mounting about a fuel conduit, to subject fuel flowing in the conduit to a magnetic field, comprising:

a pair of magnet casing portions each having a first and a second end and a surface extending between said first and second ends, and hinge means hingedly securing said first ends of said casing portions to each other, said hinge means swingably mounting said casing portions relative to one another;

at least one permanent magnet arranged in each casing portion; and said casing portions having opposed parallel central grooves extending axially through them for embracing and substantially surrounding said liquid conduit, said casing portions each having a flexible diaphragm bridging its associated groove for firmly engaging said conduit, whereby said magnet assembly can be positioned on said conduit by separating said casing portions to place said channels adjacent to said conduit and closing the casing portions, causing said flexible diaphragms to embrace said fuel conduit.

2. The assembly of claim 1, wherein said flexible diaphragms, are integrally joined to their associated casing halves.

3. The assembly of claim 1 further comprising securing means for drawing together and holding said magnet casing portions close to each other, thereby clamping said assembly onto the exterior of said conduit.

4. The assembly of claim 1 wherein said casing portions and said diaphragms and hinge means constitute one integral, continuous molded body formed of the same elastomeric material.

5. A magnet assembly for encircling a conduit for conveying a liquid, to subject liquid flowing therethrough to a magnetic field, comprising:

a magnet casing molded as a one piece member including a pair of casing halves and integral hinge means;

said casing halves and hinge being formed of a resilient material;

each casing half having a plurality of permanent magnet members embedded therein and each having a first and a second end and a surface extending between said first and second end;

said integral hinge means having a hinge axis and hingedly securing said first ends of said magnetic casing halves to one another;

said hinge means being formed of said resilient material and being integral and continuous with said casing halves; and each of said casing halves being provided with a diaphragm along said surface intermediate said first and second ends, wherein each said casing half and diaphragm provided therewith together define an opening extending through the respective casing half in a direction substantially parallel to said hinge axis, said diaphragms being yieldable to assume a substantially curved contour about an outer periphery of the conduit when said second ends are moved toward one another, whereby said diaphragms substantially conform to a peripheral shape of said liquid conduit and at least partially surround said liquid conduit and retain said magnet assembly upon said liquid conduit.

6. The assembly of claim 5 further comprising securing means encircling said casing halves for retaining said casing halves in an operative position engaging said liquid conduit and clamping said assembly onto the exterior of said liquid conduit.

7. A magnet assembly according to claim 5 wherein said casing portions are each provided with cavities for receiving a permanent magnet member;

each of said cavities having an open end extending to a surface of their associated casing half; and each said cavity including a tab for closing the respective open end.

8. A magnet assembly according to claim 5 wherein said casing halves each have an outer peripheral surface; and said outer peripheral surfaces each being engaged by securing means for retaining the magnet assembly in a position firmly embracing said conduit.

9. A magnet assembly according to claim 8 wherein said hinge means is provided with an opening aligned with said peripheral grooves, said tying means extending through said opening.

10. A magnet assembly for encircling a conduit for conveying a liquid, to subject liquid flowing therethrough to a magnetic field, comprising:

a pair of resilient casing halves each having at least one permanent magnet member embedded therein and each having a first and second end and a surface extending between said first and second end;

each of said casing halves being provided with a diaphragm along said surface intermediate said first and second ends, wherein each said casing half and diaphragm provided therewith together define an opening extending through the respective casing half, said diaphragms being yieldable when pressed against said conduit to at least partially surround said conduit and to retain said magnet assembly upon said liquid conduit; and said casing halves each having an outer peripheral surface portion, each outer peripheral surface portion being engaged by a securing means encircling said casing portions for retaining said diaphragms into firm engagement with said conduit and thereby retaining said magnet assembly on said conduit.

* * * * *